United States Patent Office 3,728,221
Patented Apr. 17, 1973

3,728,221
APPARATUS FOR FACILITATING REMOVAL OF MODERATOR BLOCKS FROM A NUCLEAR REACTOR BY TILTING THE BLOCK SUPPORTING BASE PLATES
Josef Waldis, Untersiggenthal, Switzerland, assignor to Aktiengesellschaft Brown, Boveri & Cie, Baden, Switzerland
Filed May 11, 1971, Ser. No. 142,289
Claims priority, application Switzerland, May 29, 1970, 8,048/70
Int. Cl. G21c 5/02, 5/06, 5/10
U.S. Cl. 176—84                    7 Claims

ABSTRACT OF THE DISCLOSURE

In a nuclear reactor, columns of stacked moderator blocks are arranged in side-by-side relation. To facilitate removal of the moderator blocks, each column is supported upon a base plate which is arranged to be tilted from its normal vertical position by means of a piston arrangement so as to separate the blocks in one column from those in an adjacent column.

---

The invention concerns a method for facilitating removal of stacked moderator blocks from a nuclear reactor by means of a charging device, the columns of moderator blocks standing on core support tubes, and a device for effecting the method.

The high temperatures and pressure differences in the gas space of a gas-cooled reactor can lead to deformation or even, in some cases, to breakage of individual moderator blocks. Also, the volume of these blocks can increase with the time for which the reactor has been in operation. Account is taken of this fact when a nuclear reactor is designed, but the tolerances cannot exceed a certain amount.

For these reasons, replacement of the moderator can present serious difficulties which often can be overcome only by involving dangerous operations.

The purpose of the invention is to eliminate the disadvantages stated, and to allow easy removal of the moderator blocks or columns of moderator blocks.

This purpose is achieved in that the column of blocks to be replaced is separated from the surrounding columns at least in the direction of the charging device and can be withdrawn without friction.

A device effecting the method of the invention is characterized by the fact that the vertical axes of the block columns next to the block column to be replaced are deflected towards the peripheral moderator support system which yield in accordance with the deflection of the axes.

Another variant of the subject of the invention is characterized by a rotatable vertical piston located beneath each column of moderator blocks and provided with at least one pin, and by a hydraulically operated core support coupled to the piston which allows increasing deflection in the direction of the charging machine. An improved varient of the invention is characterized by the fact that the core support tubes contain an axially movable and rotatable piston, with pin, which bears on a baseplate under the moderator block columns, and that the peripheral moderator support system is provided by way of pivoted levers with servo-pistons which are dependent on the vertical travel of the piston.

A nuclear reactor core constructed according to the invention has the advantage that removal of the moderator block columns is simplified in the event of a reduction in the density of the graphite, i.e. an increase in the volume of the blocks. This is of advantage when tests show that only individual moderator blocks need to be removed while neighbouring blocks can safety be left for a longer time in the core.

The invention is described in more detail below with the aid of the accompanying drawings.

Figure 1:
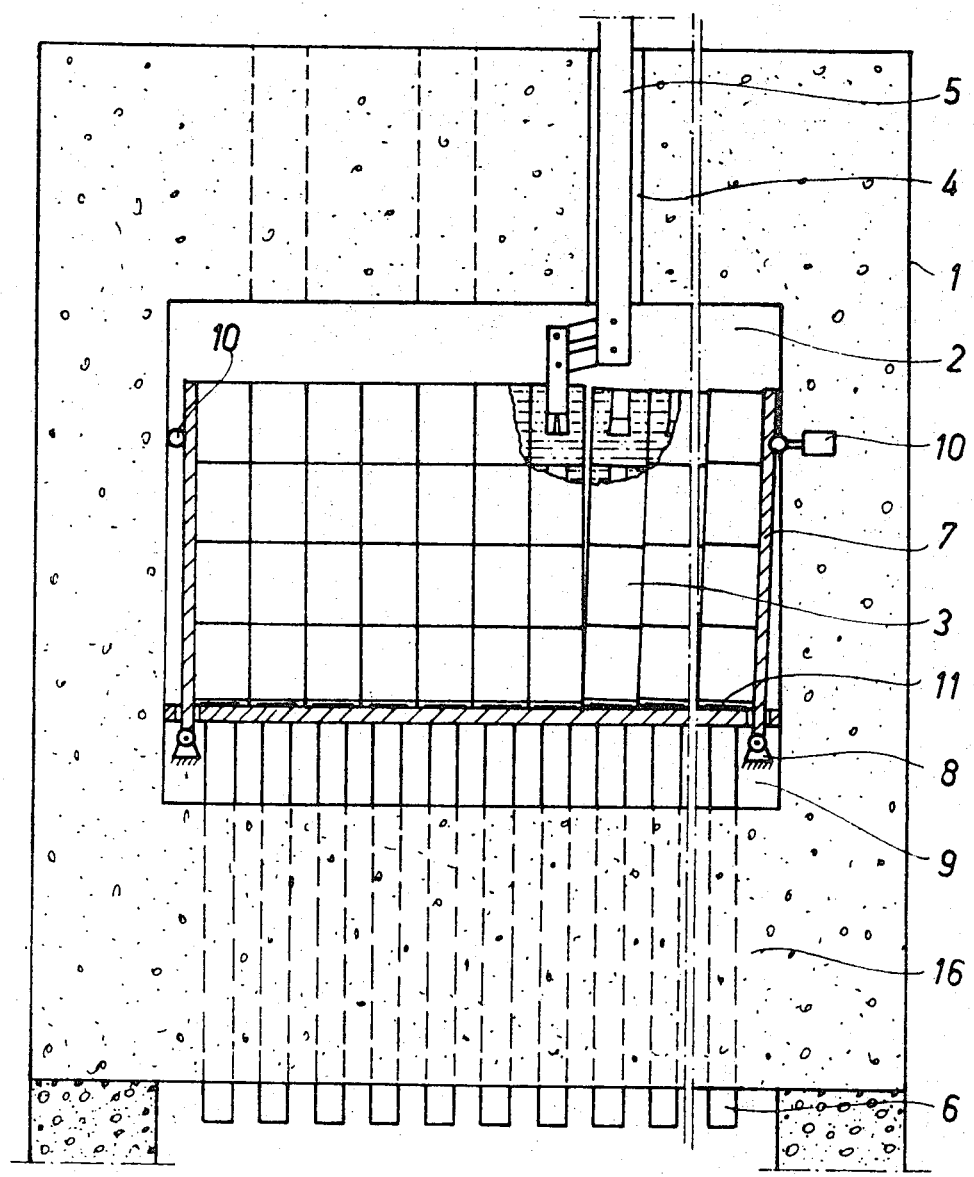
Figure 2:
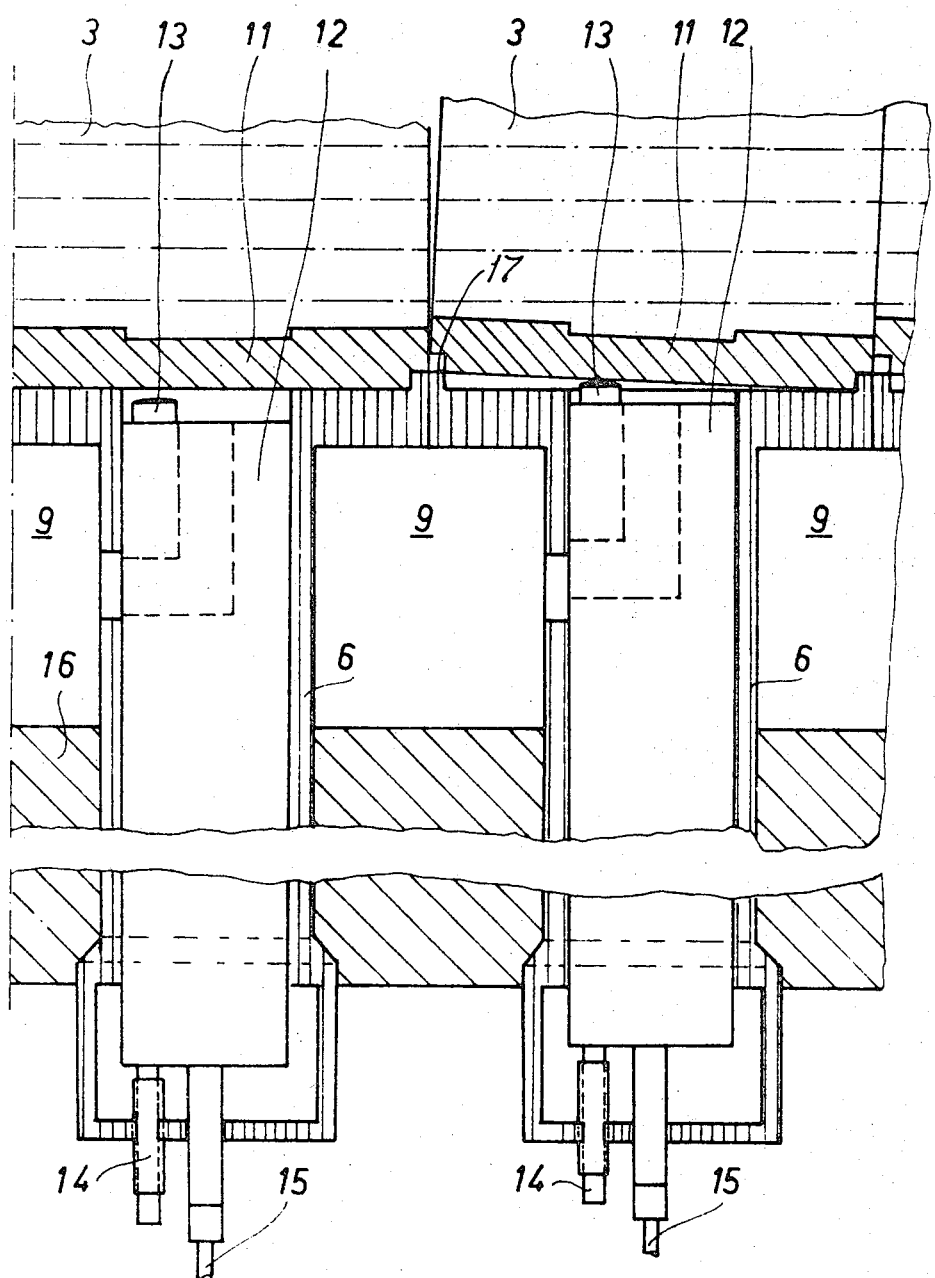

These show:
FIG. 1 the schematic construction of the core of a nuclear reactor;
FIG. 2 the tilting device of the invention.

FIG. 1 shows a simplified diagram of a reactor core with reactor pressure vessel 1 and the stacks of moderator blocks 3 in the gas space 2. The charging machine 5, which is shown schematically, is introduced through one of the opened standpipes 4. The moderator blocks 3 stand on core support tubes 6 which extend through the bottom shield 16 of the reactor pressure vessel 1.

The peripheral support system of the moderator is formed by lever 7 which is pivoted at a fixed point 8 in the lower portion 9 of the general gas space 2. To control the movement of lever 7, the upper portion of the lever is provided with a control mechanism 10. This control mechanism 1 may consist, for example, of a piston and a cylinder such that the piston is controlled in accordance with the vertical travel of the piston contained in the core support tubes 6.

By raising the vertical piston, not shown, the moderator blocks 3, or columns of blocks, can be deflected individually as depicted on the right-hand side of the core shown in FIG. 1.

FIG. 2 shows a simplified diagram of the deflection device contained in core support tube 6. The moderator blocks 3 are provided with a baseplate 11 which normally rests on the flange 17 which is connected to core support tube 6. The piston 12 contained in core support tube 6 is normally in the lowered position and extends through the bottom shield 16 of the pressure vessel 1. Flange 17 of the core support tube contains holes, not shown, which allow gas to pass from the lower gas space 9 to the moderator blocks.

Piston 12 is rotatable by means of mechanical gearing so that the pin 13 on the upper face of the piston can be turned in such a way that it deflects the moderator block, or column of moderator blocks, in the desired direction when piston 12 rises. The piston 12 is raised by means of a screw jack 14 which allows fine adjustment of the travel.

Piston 12 is coupled to a position indicator 15 which forms a further link via a connection, e.g. hydraulic, to the peripheral support system 7 of the moderator. To provide accurate removal, the rotating drive of the vertical piston is also coupled to the peripheral support system so that the appropriate sector of the peripheral support responds to a given position of the vertical piston.

When the device is operated, a gap wider at the top than at the bottom appears between the columns of moderator blocks to be removed and the surrounding columns. The columns can be tilted while utilizing the clearance between the moderator or reflector columns when in the cold condition. Greater deflection, and hence a wider gap round the column to be removed, is achieved if the peripheral support system of the moderator can also be controlled independently of piston 12.

I claim:
1. In a nuclear reactor core structure the combination comprising an assembly of parallel spaced vertically disposed core support tubes, a piston arranged in each of said tubes, a base plate supported atop of each of said tubes, a stack of moderator blocks forming a vertical block column supported upon each of said base plates, said block columns being contiguous to each other, and means for actuating said pistons in an upward direction to engage and tilt said base plates and hence also the block columns supported thereon in succession from the vertical thereby to effect a separation of each block column from the column adjacent thereto.

2. A nuclear reactor core structure as defined in claim 1 wherein the upper end of each piston is provided with an upwardly projecting eccentrically located pin which contacts the base plate eccentrically of the block column to effect the tilting action, and means are provided to rotates the piston about its axis.

3. A nuclear reactor core structure as defined in claim 1 wherein each of said core support tubes is provided with a flange to provide a support for the baseplate.

4. A nuclear reactor core structure as defined in claim 1 and which further includes a position indicator cooperative with each core support tube for indicating the vertical position of the piston therein.

5. A nuclear reactor core structure as defined in claim 1 and which further includes a movable side wall structure providing a peripheral support for said moderator block columns, and means for moving said side wall structure in the direction away from said block columns.

6. A nuclear reactor core structure as defined in claim 5 wherein said means for moving said side wall structure is actuated in combination with movement of said pistons.

7. A nuclear reactor core structure as defined in claim 5 wherein said side wall structure is pivotally mounted and wherein said means for moving said side wall structure is constituted by a piston and cylinder unit, the piston of which is connected to the pivotal wall for movement in accordance with the upward movement of said pistons which effect tilting of said block column.

References Cited
UNITED STATES PATENTS

| 3,206,373 | 9/1965 | Dupy | 176—84 |
|---|---|---|---|
| 3,174,906 | 3/1965 | Rouge | 176—84 X |

FOREIGN PATENTS

| 1,366,384 | 12/1963 | France | 176—84 |
|---|---|---|---|
| 1,217,141 | 12/1970 | Great Britain | 176—84 |

CARL D. QUARFORTH, Primary Examiner

R. S. GAITHER, Assistant Examiner

U.S. Cl. X.R.

176—27, 30, 85, 87